(12) United States Patent
Martin et al.

(10) Patent No.: US 11,838,954 B2
(45) Date of Patent: *Dec. 5, 2023

(54) TERMINAL DEVICE, INFRASTRUCTURE EQUIPMENT, METHODS AND INTEGRATED CIRCUITRY

(71) Applicants: Sony Group Corporation, Tokyo (JP); Sony Mobile Communications Inc., Tokyo (JP)

(72) Inventors: Brian Alexander Martin, Basingstoke (GB); Anders Berggren, Lundavägen (SE)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,423

(22) Filed: Oct. 18, 2021

(65) Prior Publication Data

US 2022/0039173 A1    Feb. 3, 2022

Related U.S. Application Data

(63) Continuation of application No. 16/077,282, filed as application No. PCT/EP2017/051086 on Jan. 19, 2017, now Pat. No. 11,153,910.

(30) Foreign Application Priority Data

Feb. 12, 2016  (EP) ..................................... 16155580

(51) Int. Cl.
 *H04W 74/08* (2009.01)
 *H04W 88/02* (2009.01)

(52) U.S. Cl.
 CPC ....... *H04W 74/0833* (2013.01); *H04W 88/02* (2013.01)

(58) Field of Classification Search
 CPC ...................................................... H04W 88/02
 See application file for complete search history.

(56) References Cited

U.S. PATENT DOCUMENTS 8,837,321 B2    9/2014  Henttonen et al.
11,153,910 B2 *  10/2021  Martin .............. H04W 74/0833
(Continued)

FOREIGN PATENT DOCUMENTS

EP    3 016 468 A1    5/2016
GB    2 489 690 A    10/2012
(Continued)

OTHER PUBLICATIONS

Ericsson, "RRC Connection Control for NB-IoT," Tdoc R2-156394, 3GPP TSG-RAN WG2 #92, Anaheim, USA, Nov. 16-20, 2015, pp. 1-4.

(Continued)

*Primary Examiner* — James P Duffy
(74) *Attorney, Agent, or Firm* — XSENSUS LLP

(57) ABSTRACT

A terminal device for use with a wireless telecommunications network, the terminal device comprising: storage configured to store ancillary information not essential to every connection between the terminal device and the wireless telecommunications network; a controller configured to produce data indicative of the stored ancillary information; a transmitter configured to transmit the produced data to the wireless telecommunication network; and a receiver configured to receive an indication from the wireless telecommunication network to transmit the ancillary information to the
(Continued)

wireless telecommunication network, wherein in response to the indication, the transmitter is configured to transmit the ancillary information.

20 Claims, 11 Drawing Sheets

(56) References Cited

U.S. PATENT DOCUMENTS

| | | | |
|---|---|---|---|
| 2011/0216681 | A1 | 9/2011 | Tao et al. |
| 2011/0299492 | A1 | 12/2011 | Lee et al. |
| 2012/0275305 | A1 | 11/2012 | Lin |
| 2012/0287873 | A1 | 11/2012 | Liu et al. |
| 2013/0308564 | A1 | 11/2013 | Jain et al. |
| 2014/0128057 | A1 | 5/2014 | Siomina et al. |
| 2016/0143060 | A1 | 5/2016 | Fujishiro et al. |
| 2017/0180086 | A1 | 6/2017 | Xiong et al. |

FOREIGN PATENT DOCUMENTS

| | | |
|---|---|---|
| JP | 2015-8379 A | 1/2015 |
| WO | 2011/161574 A1 | 12/2011 |

OTHER PUBLICATIONS

Ericsson, China Mobile Com. Corporation, "NB-IOT—Measurements in connected mode," R2-156172, 3GPP TSG RAN WG2 #92, Anaheim, USA, Nov. 16-20, 2015, pp. 1-3.

Ericsson, NTT Docomo Inc, China Mobile Com. Corporation, "Measurement reporting in NB-IoT," R2-161309, 3GPP TSG-RAN2 Meeting #93, St. Julian, Malta, Feb. 15-19, 2016, pp. 1-3.

Holma, H. and Toskala, A., "LTE for UMTS: OFDMA and SC-FDMA Based Radio Access," First published: Mar. 31, 2009, Copyright © 2009 John Wiley & Sons, Ltd., Print ISBN: 9780470994016, pp. 1-8.

Huawei, Hisilicon, "Idle Mode Mobility," R2-156762, 3GPP TSG-RAN WG2 #92, Anaheim, USA, Nov. 16-20, 2015, pp. 1-4.

LG Electronics, Cati, Vodafone, Huawei, "New SI proposal: Feasibility Study on L TE-based V2X Services," RP-151109, 3GPP TSG RAN Meeting #68, Malmo, Sweden, Jun. 15-18, 2015.

Qualcomm Incorporated, "New Work Item: NarrowBand IOT (NB-IOT)," RP-151621, 3GPP TSG RAN Meeting #69, Phoenix, USA, Sep. 14-16, 2015, pp. 1-9.

International Search Report and Written Opinion for International Application No. PCT/EP2017/051086 dated Apr. 11, 2017.

* cited by examiner

Option 1 - information available, request, report during random access procedure.

TERMINAL DEVICE, INFRASTRUCTURE EQUIPMENT, METHODS AND INTEGRATED CIRCUITRY

CROSS-REFERENCE TO RELATED APPLICATIONS

This application is a continuation of U.S. application Ser. No. 16/077,282, filed Aug. 10, 2018, which is a National Stage Application based on PCT/EP2017/051086, filed Jan. 19, 2017, which claims priority to EP 16155580.0, filed Feb. 12, 2016, the entire contents of each are incorporated herein by reference.

BACKGROUND

Field of Disclosure

The present disclosure relates to a terminal device, infrastructure equipment, methods and integrated circuitry.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to a first aspect, there is provided a terminal device for use with a wireless telecommunications network, the terminal device comprising: storage configured to store ancillary information not essential to every connection between the terminal device and the wireless telecommunications network; a controller configured to produce data indicative of the stored ancillary information; a transmitter configured to transmit the produced data to the wireless telecommunication network; and a receiver configured to receive an indication from the wireless telecommunication network to transmit the ancillary information to the wireless telecommunication network, wherein in response to the indication, the transmitter is configured to transmit the ancillary information.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
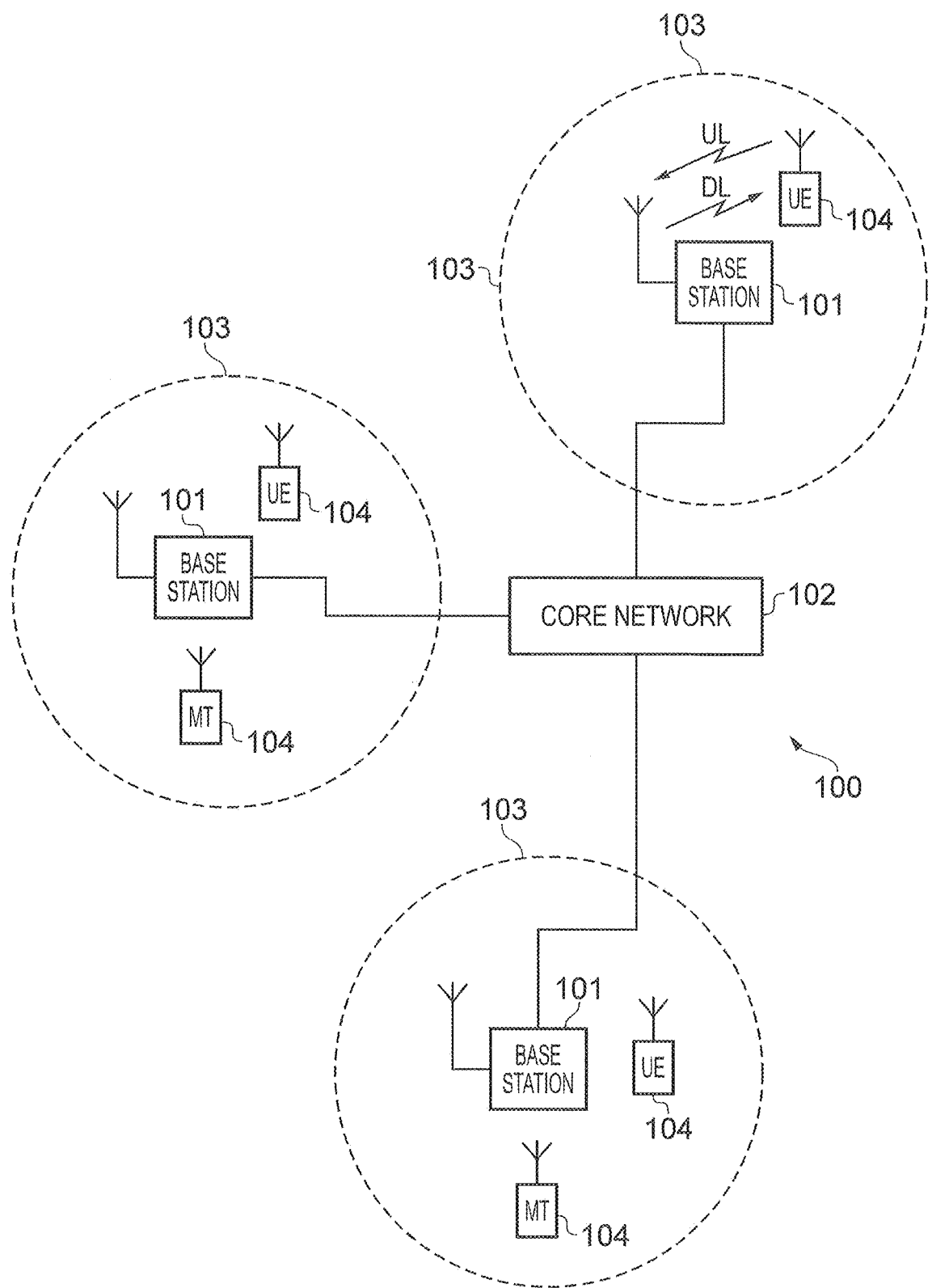
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device and so forth. A base station may also be referred to as a transceiver station, NodeB, eNodeB (eNB for short), infrastructure equipment and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
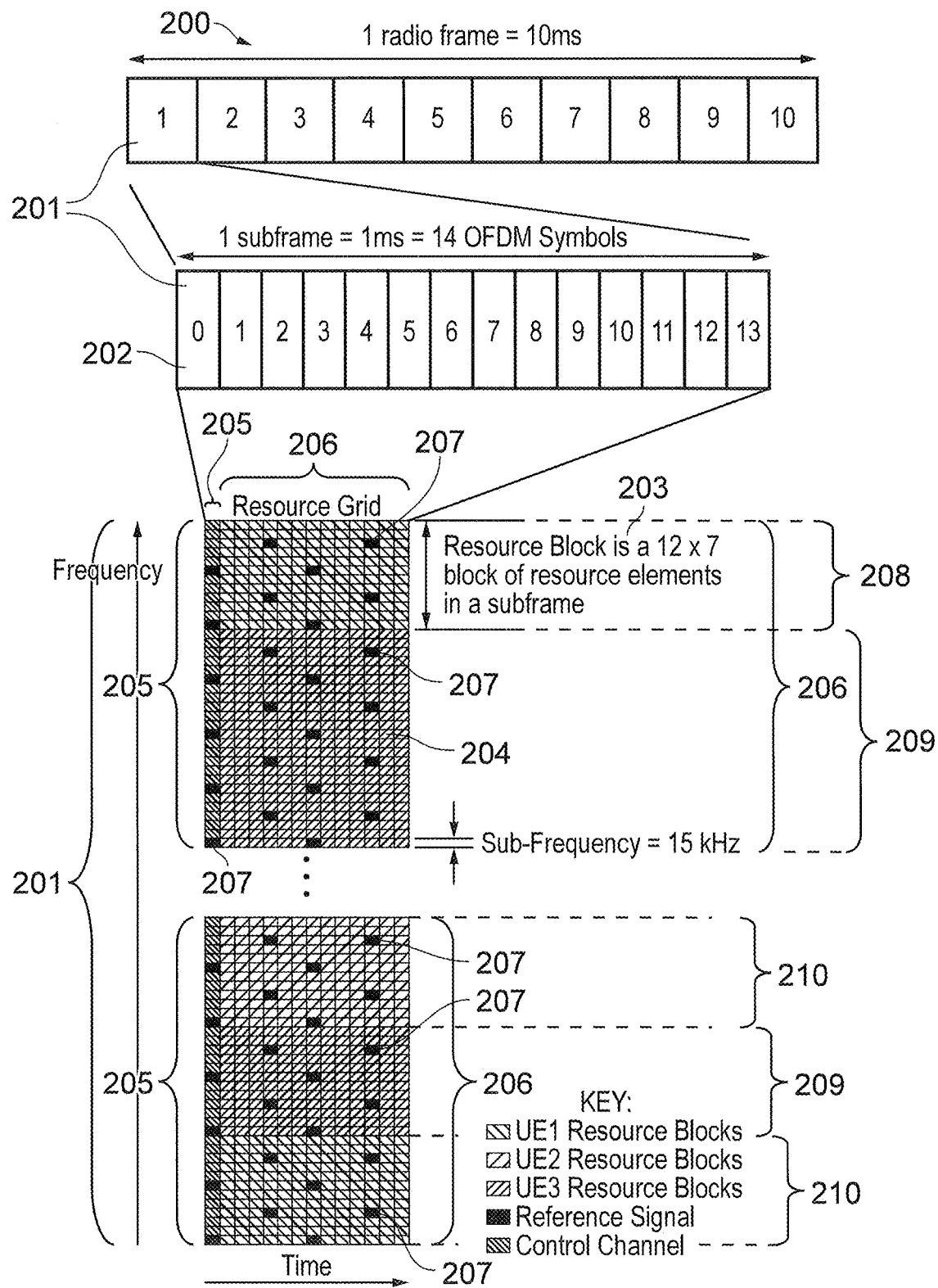
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LTE it is conventionally fixed at 15 kHz. However it has been proposed in the future [2] [3] to provide also a reduced subcarrier spacing of 3.75 kHz for certain parts of the LTE wireless access interface for either the uplink or the downlink or both. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
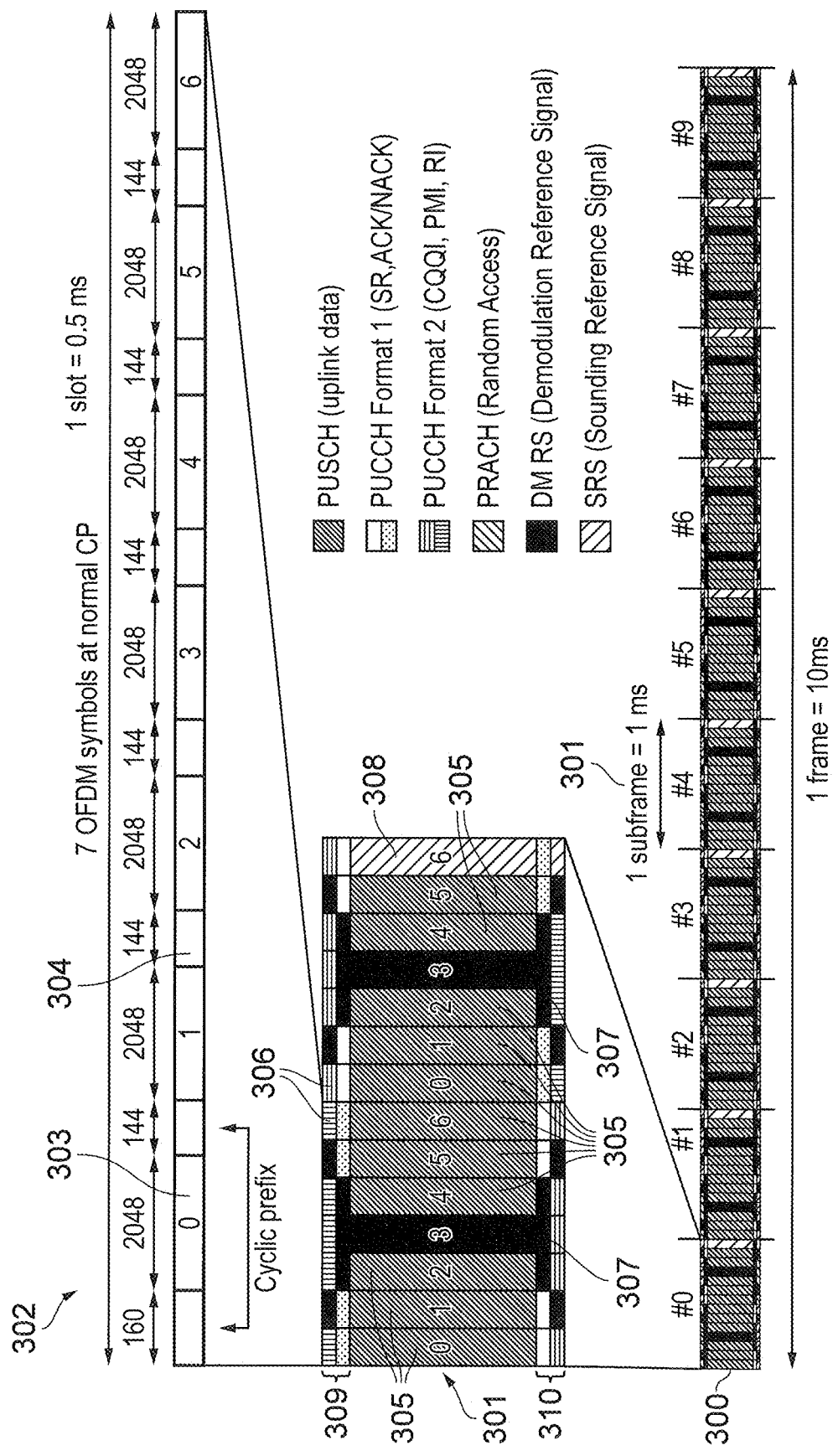
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration.

Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Narrowband Internet of Things

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) wireless access interface was agreed [2]. This project is aimed at improved indoor coverage, support for a massive number of low throughput devices, low delay sensitivity, ultra-low device cost, low device power consumption and (optimised) network architecture. An example of such a device is a smart meter.

Figure 4:
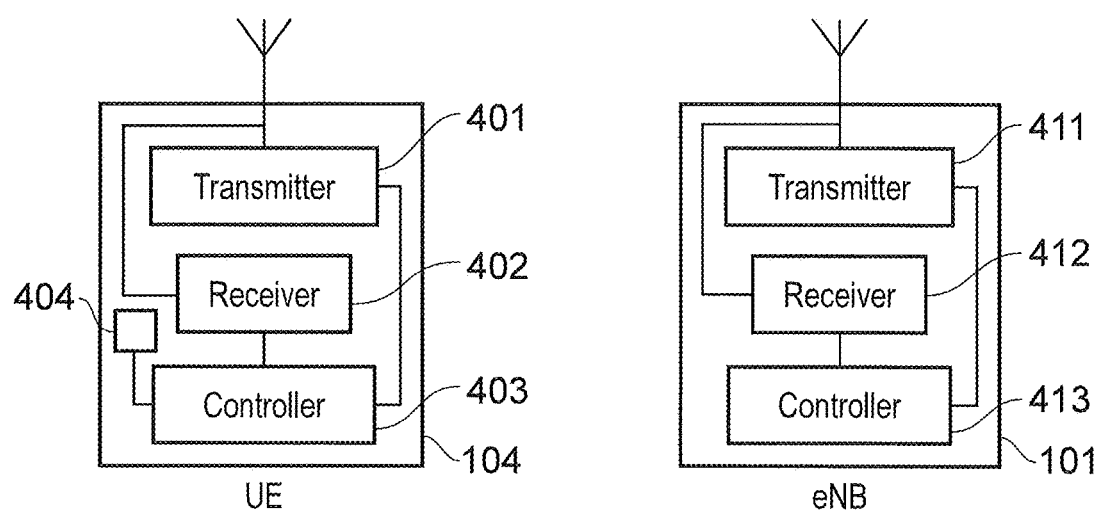
FIG. 4 is a schematic block diagram of a communications device and an infrastructure equipment.

It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier FIG. 4 provides an example schematic block diagram of a terminal device or UE 104 and a infrastructure equipment or eNB 101. As shown in FIG. 4, the UE 104 includes a transmitter 401 and a receiver 402 (which together form a transceiver) which are controlled by a controller 403. Storage 404 is also provided. Correspondingly, the eNB 101 includes a transmitter 411 and a receiver 412 (which together form a transceiver) which are controlled by a controller 413 (which can also implement a scheduler function). As explained above, the UE 104 transmits and receives signals to and from the eNB 101 via a wireless access interface provided by the eNB as part of the wireless communications network. Each of the UE 104 and eNB 101 are configured to exchange signals with each other using NB-IoT.

For the purposes of mobility, NB-IOT devices can support cell reselection. They do not need to support network initiated handover procedure. When supporting cell reselection, the UE 104 needs to perform measurements on neighbouring cells. The neighbouring cells can either be on the same frequency (UE 104 performs intra-frequency cell reselection) or on a different frequency (UE 104 performs inter-frequency cell reselection).

Despite not supporting connected mode handover, a number of use-cases for the provision of measurements from the UE 104 to the network have been identified. Some of these use-cases include network planning and configuration for, in particular and not limited to, intra and inter frequency neighbour cell information, re-direction with RRC connection release to enable load balancing, and positioning for such applications as device tracking and the like. These are referenced in [3]

Additionally, due to security, measurement information cannot be sent to the network without first having activated AS level security (ciphering, integrity protection) in order to avoid potentially disclosing any UE location related information conveyed in the Measurement reports, such as reference signal received power (RSRP) measurements of neighbour cells which could be used for example for RF fingerprint matching. Of course, not all measurements necessarily require AS level security, such as where the measurements include just the cell ID or an indication of suitable carriers.

In NB-IoT, there are two mechanisms for exchanging data; the user plane solution and the control plane solution. Both of these mechanisms are known to the skilled person. The control plane solution is described in relation to FIGS. 5 and 6 and the user plane solution is described with reference to FIG. 7. However, the pertinent points are noted below.

1. User-plane solution. This is very similar to normal LTE operation, whereby a connection is established and the data is sent using a ciphered user-plane radio bearer. There is an enhancement to allow the RRC Connection to be suspended and resumed—the Access Stratum (AS) context (including security information) is stored in the UE and the eNB 101 and the network in order to quickly resume a connection. It is proposed with this solution to report measurements of the network taken by the eNB 101 such as the RSRP of the cell and neighbouring cells.
2. Control-plane solution. In this procedure the eNB 101 sends data piggybacked on a control plane signalling message, such as RRC Connection Setup complete. The data is sent without AS security (security is handled by Non-Access Stratum (NAS)). It is not possible to transmit detailed measurement information using the control plane solution due to lack of AS security, since the measurement information is handled by AS level and it is a requirement that security must be active in order to transmit measurement information in LTE.

However, although it is desirable to send measurement information such as the RSRP for self optimising networks, positioning, or radio resource management, or other data such as battery data, diagnostic information about the device, or other ancillary information relating to either the network or about the status of the terminal device or the user of the terminal device, to the network. The narrow bandwidth and small battery size of NB-IoT devices means that this ancillary information should be sent only when necessary. More generally, although this is particularly relevant to NB-IoT devices, the desire to reduce battery consumption and use bandwidth more efficiently is applicable to any kind of terminal device and wireless network.

It is an aim of the present disclosure to address this.

Figure 5:
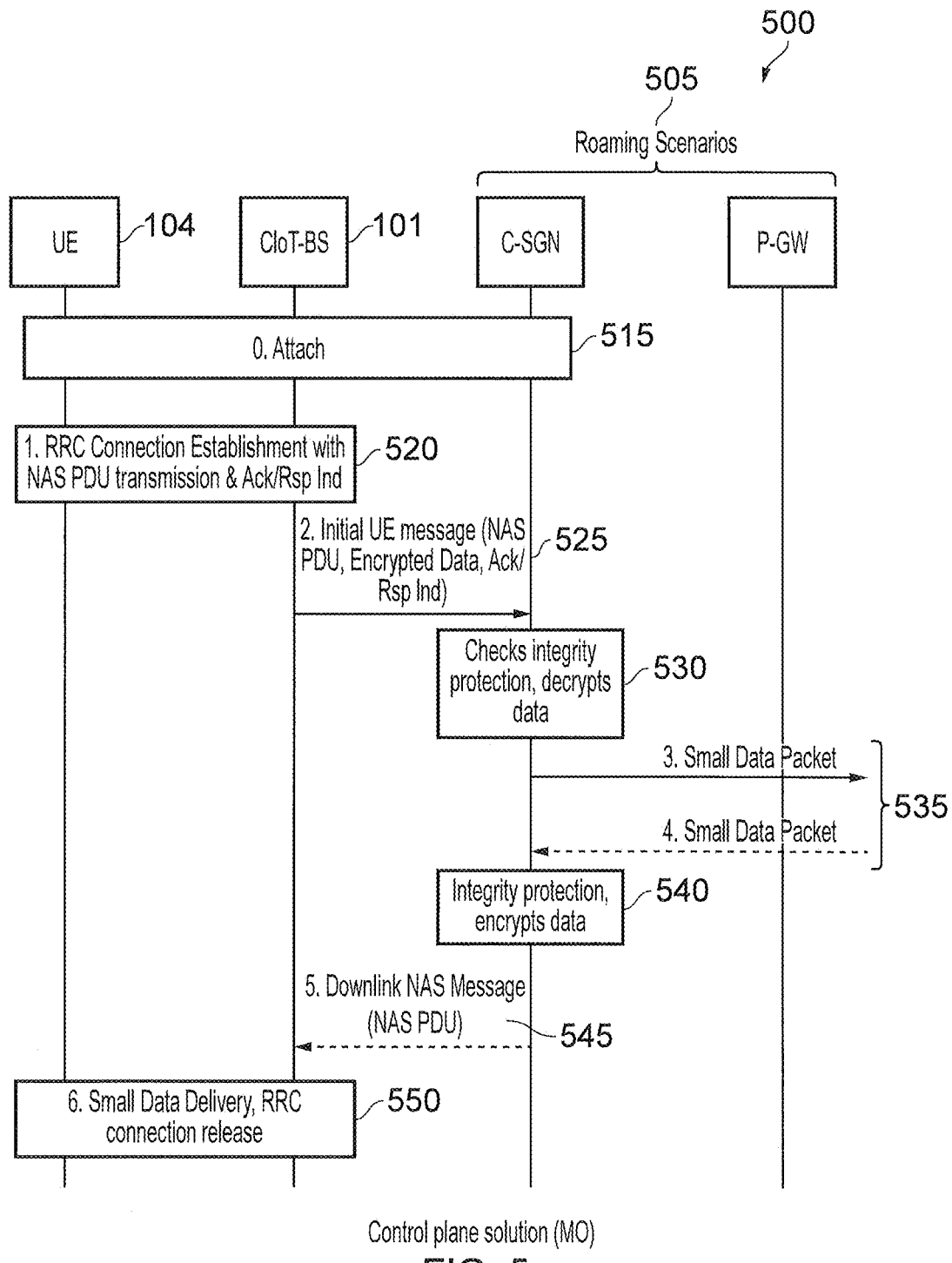
FIG. 5 is a schematic signal diagram explaining a control plane solution for mobile originating data.

Referring to FIG. 5 a system 500 is shown to explain the control plane solution where data originates at the UE 104. The control plane solution is understood by the skilled person. The UE 104 is shown connected to eNB 101. The eNB then communicates with the network 500. The UE 104 attaches to the network in 515. The UE 104 connects to the eNB 101 in 520 and the eNB 101 passes this to the network in 525. The integrity of the data and decryption is performed by the network in 530 and is communicated to the remainder of the network. A reply is subsequently received from the network. The data communication within the network is indicated as 535.

The reply is encrypted by the network in 540 and is passed to the eNB 101 in 545. The reply is passed to the UE 104 and the connection between the eNB 101 and the UE 104 is released in 550.

Figure 6:
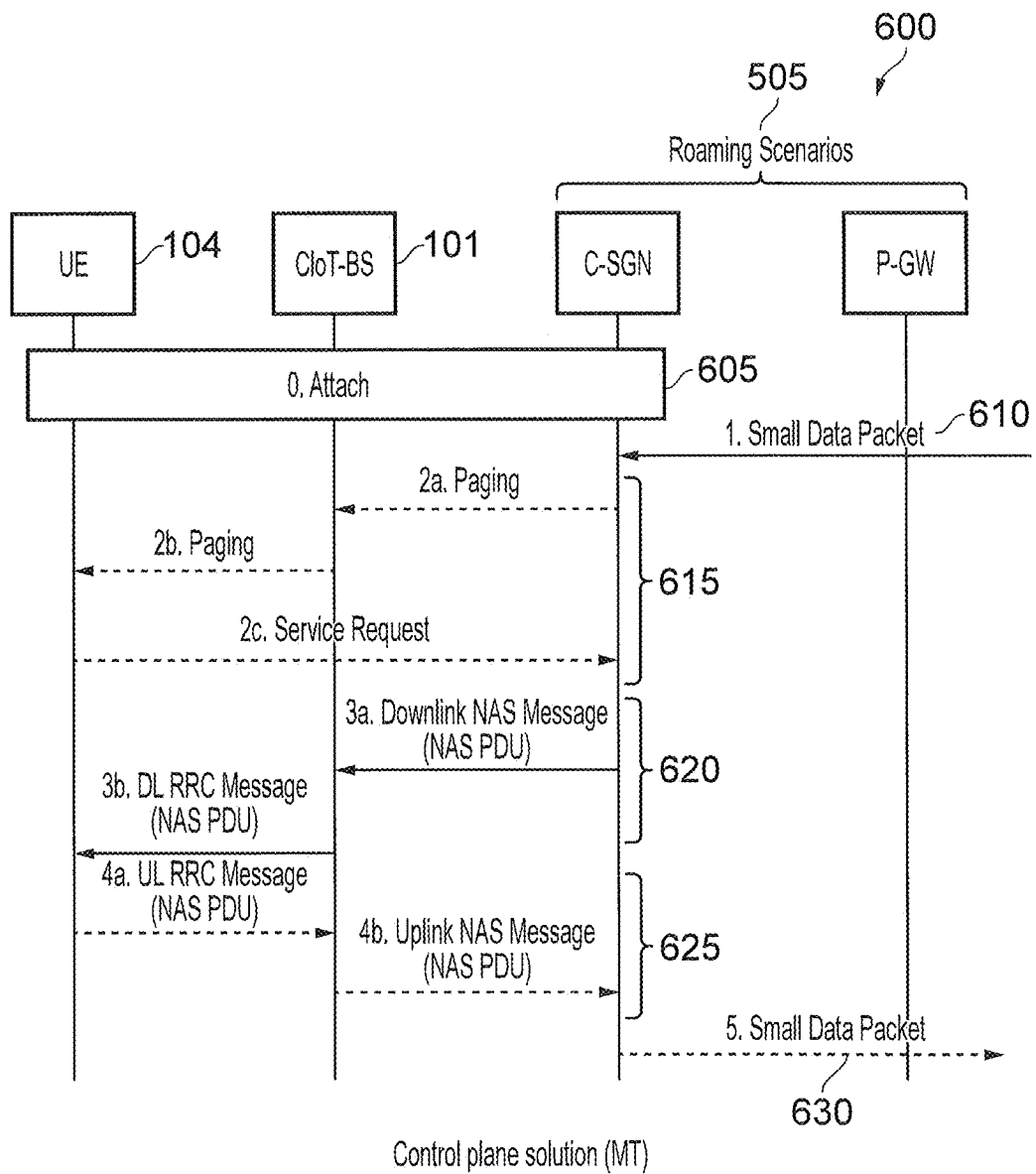
FIG. 6 is a schematic signal diagram explaining a control plane solution for mobile terminating data.

Referring to FIG. 6 a system 600 is shown to explain the control plane solution where the data terminates at the UE 104. The UE 104 is shown connected to eNB 101. The eNB 101 then communicates with the network 500 in step 605. Data is passed to the network in step 610. The network passes the data to the eNB 101 and the eNB 101 forwards this to the UE 104. The UE 104 passes a corresponding service request back to the network (via the eNB 101). This is step 615 in FIG. 6.

The network passes the downlink NAS message to the eNB 101 which is subsequently forwarded to the UE 104 as a RRC message in step 620. The UE 104 passes an uplink RRC message to the eNB 101 that is subsequently passed to the network in step 625. The network passes the data into the network in step 630.

Figure 7:
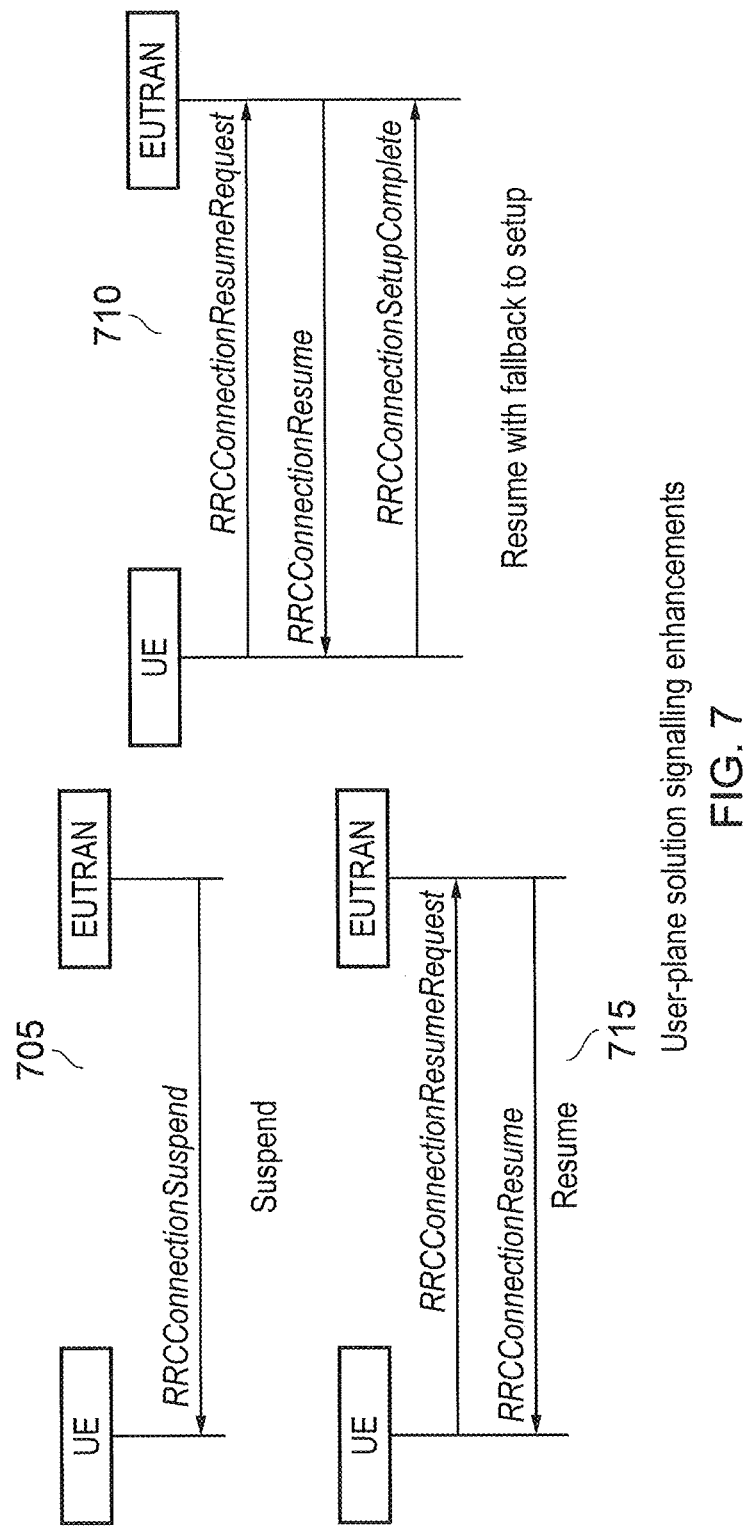
FIG. 7 is a schematic signal diagram explaining a user plane solution with signal enhancements.

FIG. 7 shows a proposed enhancement 700 to the user plane solution which would be known to the skilled person. In essence, this enhancement allows the UE 104 to connect more quickly to the network with less signal overhead by suspending the connection rather than terminating the connection completely. The suspend signalling is shown in 705, the resume is shown in 715 and a known resume with fallback to setup is shown in 710.

Figure 8:
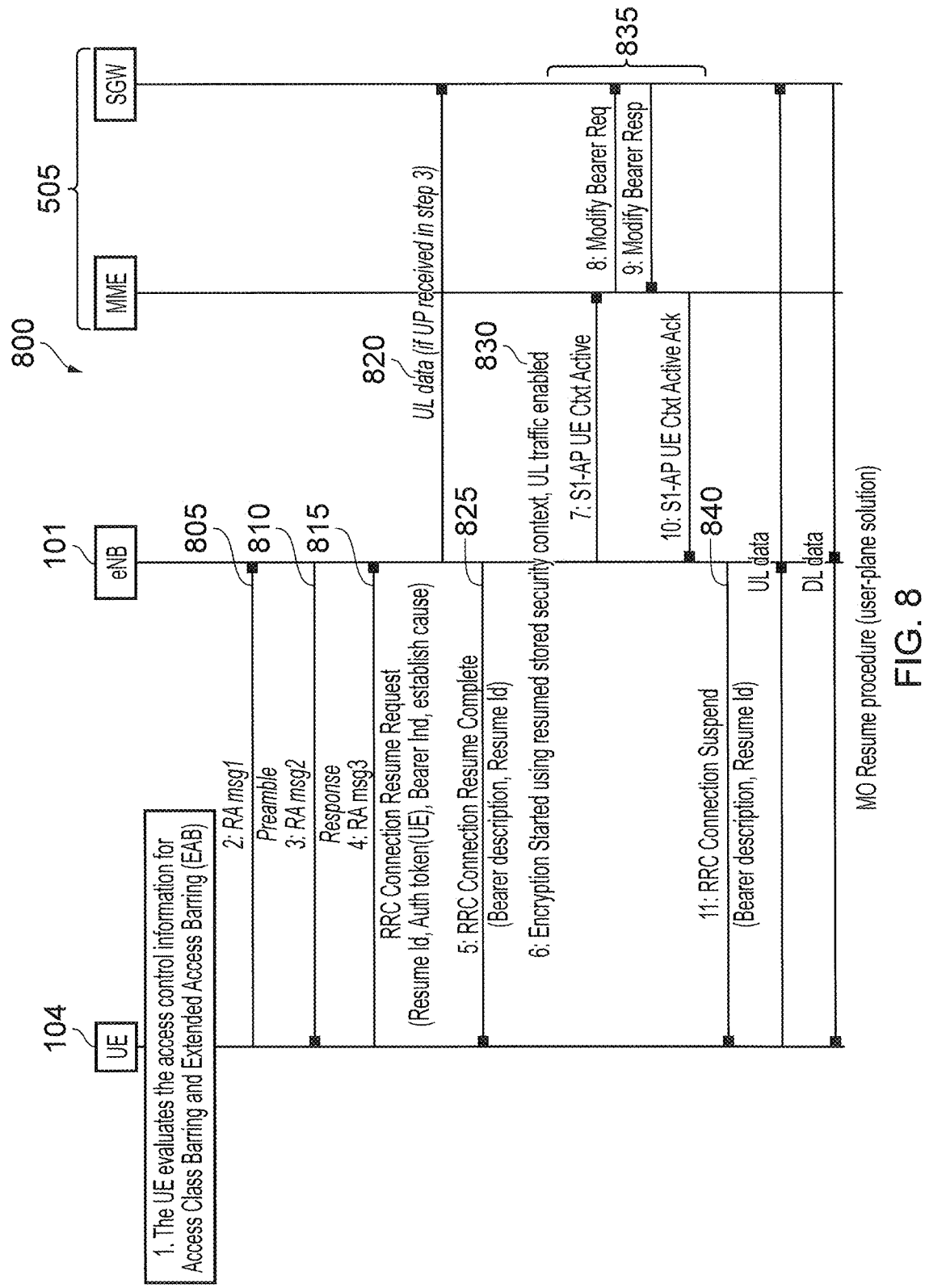
FIG. 8 is a schematic signal diagram explaining a user plane solution with signal enhancements for mobile originating data.

FIG. 8 explains the user plane solution where the data originates at the UE 104. A random access preamble 805 is selected by the UE 104. The random access preamble is selected from a set of preambles provided by the network. This is sent to the eNB 101 in 805. The eNB 101 replies to the random access preamble in 810. The UE 104 sends a RRC connection resume request (assuming that the UE 104 is suspended) or an RRC connection request (if the UE 104 is operating in idle mode). This is step 815. After connection, uplink data to be communicated to the network is sent in 820. An RRC connection resume complete signal is sent between the eNB 101 and the UE 104. Up to this point, the data between the UE 104 and the eNB is not encrypted. Transmission of encrypted data is enabled in 830. The transfer of data between the UE 104 and the eNB 101 occurs in 835 and the connection is suspended again in 840.

Figure 9:
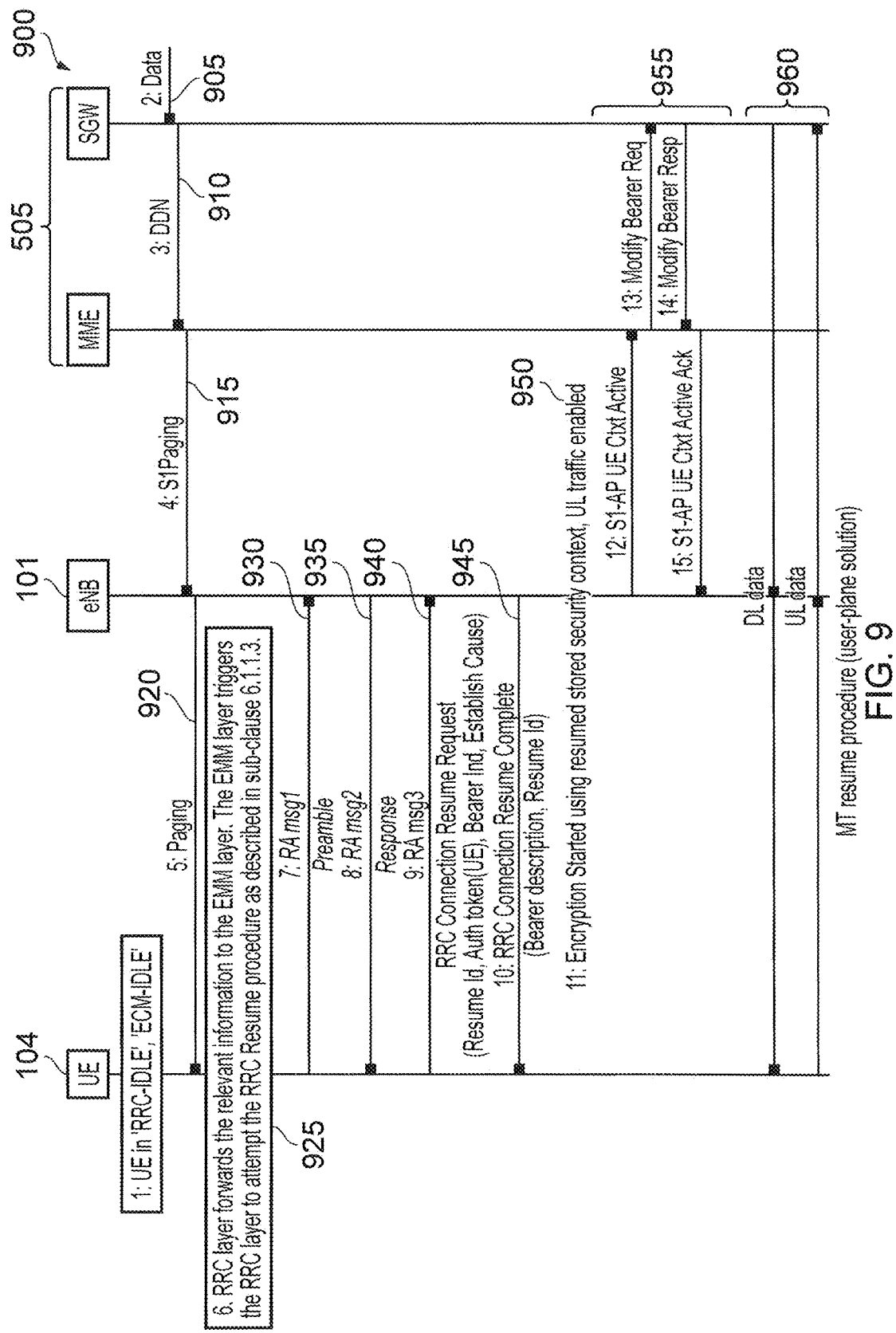
FIG. 9 is a schematic signal diagram explaining a user plane solution with signal enhancements for mobile terminating data.

FIG. 9 explains the user plane solution where the data terminates at the UE 104. The data is sent across the network in steps 905, 910 and 915. The eNB 101 pages the UE 104 in 920. The RRC resume procedure is commenced at step 925. The UE 104 selects a random access preamble from a set of preambles provided by the network in 930. The eNB 101 replies to the random access preamble in 935. The UE 104 sends a RRC connection resume request (assuming that the UE 104 is suspended) or an RRC connection request (if the UE 104 is operating in idle mode). This is step 940. An RRC connection resume complete signal is sent between the eNB 101 and the UE 104 in step 945. Encryption is enabled at this point (step 950). Various network signalling then takes place in step 955 followed by downlink and uplink data in step 960.

Figure 10:
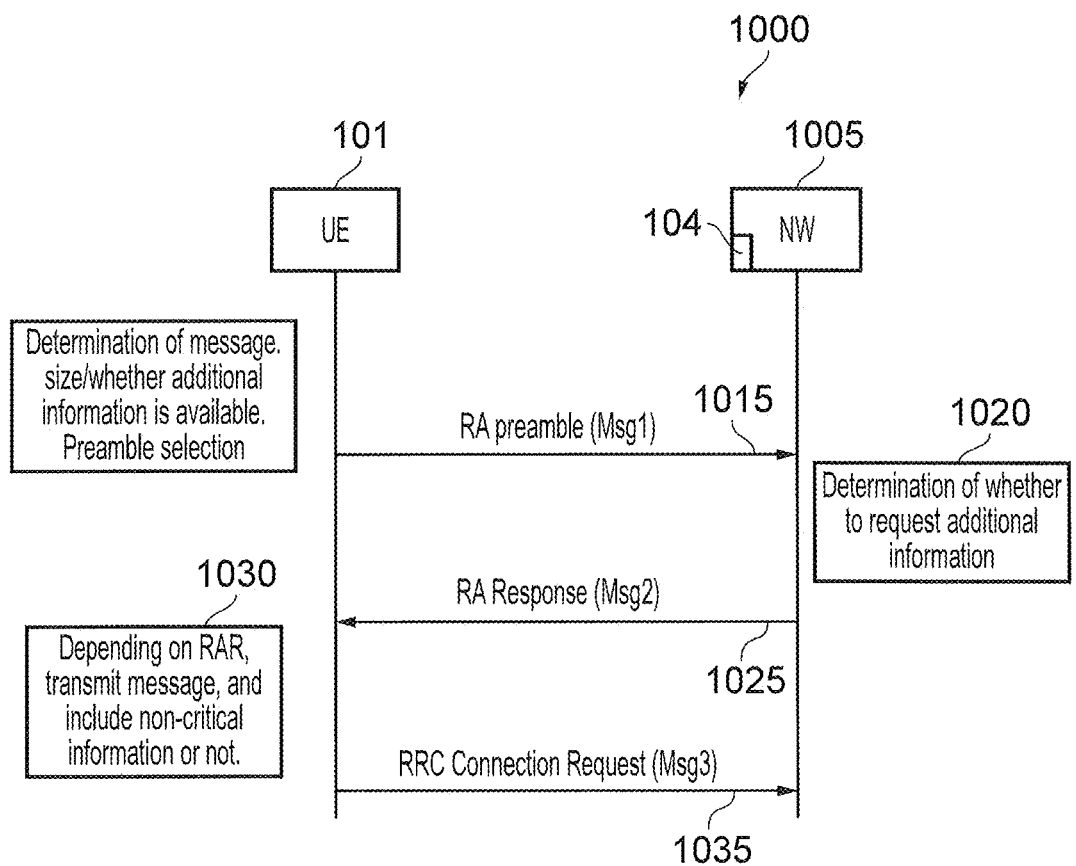
FIG. 10 is a schematic signal diagram explaining a first option according to embodiments.

FIG. 10 explains a signalling diagram 1000 according to embodiments of the disclosure. In the signalling diagram 1000, a first option is shown. It should be noted that the network 1005 includes eNB 104, but also other parts of the infrastructure. This nomenclature is for ease of reference.

In idle mode, the UE 101 takes measurements. These measurements may include the RSRP or RSRQ, the signal strength or quality of the current cell or neighbouring cells and other measurements relating to the network environment. Other additional measurements such as position information of the UE 101 and the like may also be taken. These measurements are not critical to every connection between the network 1005 and the UE 101. In other words, failure to provide these measurements to the network will not terminate the connection between the UE 101 and the network 1005. These measurements are examples of ancillary data which may be provided to the network. Other examples of the ancillary data include home energy readings if the NB-IoT device is a smart meter, personal health information of the user if the NB-IoT is a fitness band, battery life remaining or the like. In other words, the ancillary data is not limited to data pertaining to a measurement.

However, as already noted, in the event that the ancillary data is measurement data, these measurements may be desirable from the network's perspective. For example, during RRC Connection establishment or at RRC Connection Release, the eNB 104 may redirect the UE 101 to a different eNB if the reported RSRP value of that cell is above a threshold. However, the connection between the UE 101 and the network 1005 would not be terminated if the UE 101 was not diverted to the different eNB.

This ancillary data is stored within storage 404 within the UE 104.

Referring back to FIG. 10, when the UE 104 wishes to initiate data transfer, a random access preamble is selected from a set of random access preambles provided by the network. This is explained with reference to FIGS. 5 and 8 for the control plane solution and the user plane solution respectively. In embodiments of the disclosure, however, the network allocates specific ones of the set of random access preambles to indicate that the UE 104 has ancillary data that is not critical to the connection. This random access preamble may simply indicate that the UE 104 has ancillary data to transmit.

The selection of the preamble may also indicate the size of the ancillary data. For example, for an RSRP measurement, only a small amount of data would be required. However, other forms of ancillary data may be larger, such as signal quality information for all received carriers. In this case, the UE 104 will select the random access preamble according to the size of the ancillary data. By selecting the preamble in this manner, the network understands when the ancillary data should be transferred.

To restate this, the first (critical) part of the message would always be below the threshold, so UE 104 would select from a preamble set A if there is no additional information, or if the additional information does not cause the message size threshold to be exceeded. If the additional information causes the message size threshold to be exceeded, then the UE 104 would select from preamble set B.

The controller 413 determines, firstly whether the storage 404 contains the ancillary data. The controller 413 may also determine the size of the ancillary data. On this basis, an appropriate random preamble is selected in step 1010. The selected preamble is sent to the network 1005 via the eNB 104 in the Random Access Preamble in 1015 (noted in step 515 in FIG. 5; 605 in FIG. 6; 805 in FIGS. 8 and 930 in FIG. 9).

The network 1005 then decides at step 1020 whether the ancillary data should be transmitted by the UE 104. This decision may be based on the congestion on the cell upon which the UE 104 is to be re-directed. If the network 1005 has high levels of congestion on the cell, the network may request the UE 104 provides the RSRP measurement of neighbouring cells. This allows the network to provide better traffic management. Alternatively, the network 1005 may determine that the UE 104 should transmit the energy consumption of a household at a particular point in the day, for example, when the energy provider's servers are less busy.

The network 1005 (via the eNB 101) provides a random access response (RAR) indicating whether the additional information should be sent or not. The random access response is step 1025 in FIG. 10, part of step 515 in FIG. 5; step 605 in FIG. 6, 810 in FIGS. 8 and 935 in FIG. 9. This indication informs the UE 104 which message size to use as well as which resources or random access channel to send the ancillary information on. In addition, the indication provided by the network may tell the UE 104 the format in which to send the ancillary data. For example, the network 1005 may inform the UE 104 to send just the cell ID (which is a shorter message) if that is all the network 1005 requires. Alternatively or additionally, the network may request other information such as RSRP values which is a longer message, but contains different information useful to the network 1005. Further, the network 1005 may instruct the UE 104 to use either the user plane solution or the control plane solution. In other words, in the event of the control plane solution, the controller of the UE 104 would control the transmitter to set up a connection with the network 1005 which allows transmission of the ancillary data by piggybacking this data on a control plane message. Also, in the event of a user plane solution, the controller of the UE 104 would configure the transmitter to set up a connection with a dedicated user plane radio bearer for transmitting the ancillary data. In essence, the UE 104 may receive from the network 1005 an indication of the type and format of the message which is to convey the ancillary data.

In response to the indication in step 1025, the UE 104 determines whether to transmit the ancillary information. This is step 1030. Depending on the indication from the network 1005, the UE 104 may decide to send particular ancillary data or ancillary data in a particular format. The ancillary data is then sent on the RRC connection request in step 1035 if the size of ancillary data is small enough. Of course, in the event that the UE is using the resume procedure, the ancillary data will be sent on the RRC connection resume request.

Figure 11:
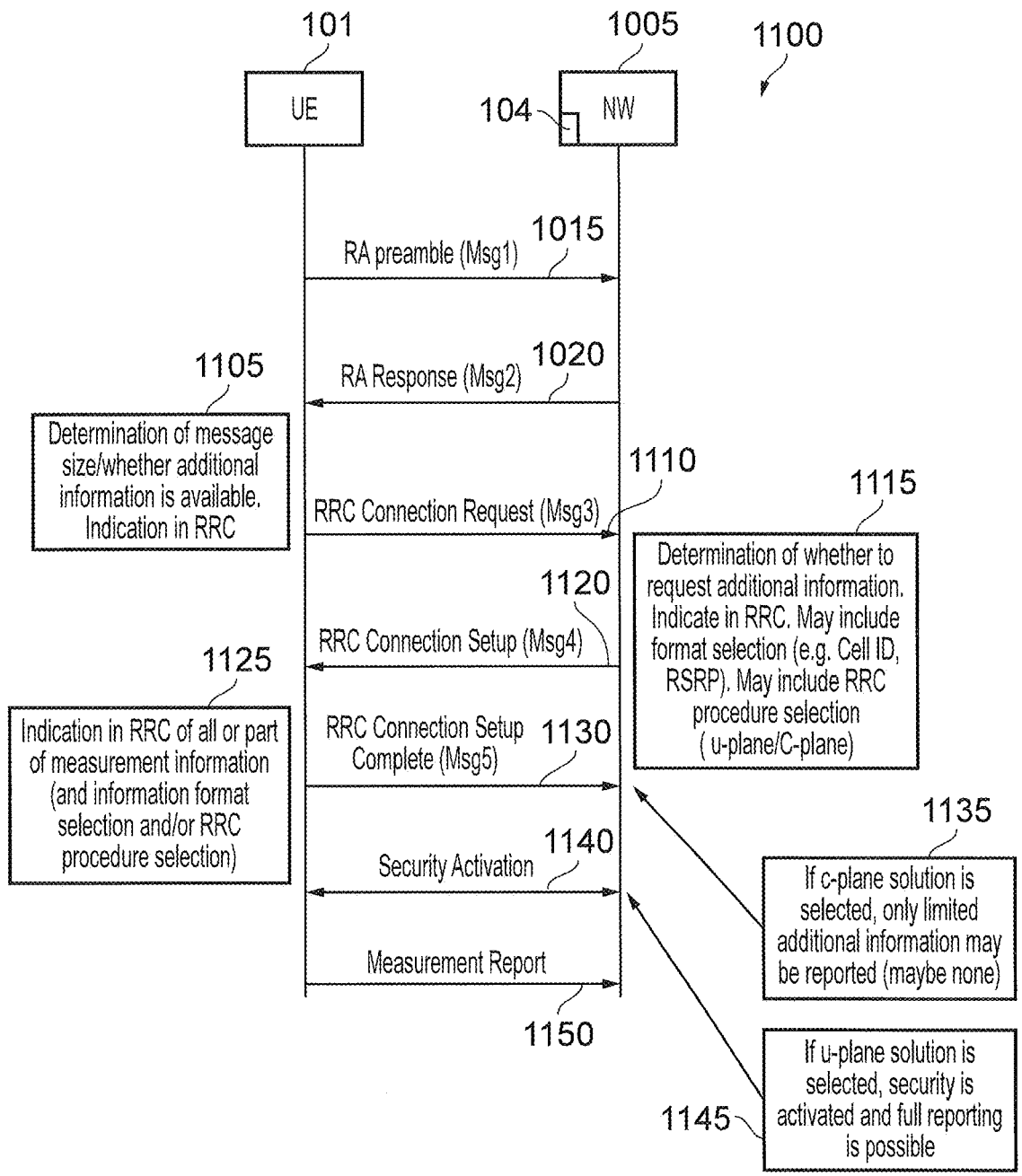
FIG. 11 is a schematic signal diagram explaining a second option according to embodiments.

In FIG. 11 a second option is shown. This is explained with signal diagram 1100. Again, network 1005 includes the eNB 104.

In this option, instead of indicating the presence of the ancillary data in the random access preamble and receiving an indication from the network in the random access response, the determination of the presence of the ancillary data is performed in step 1105. In other words, the UE 104 determines the presence of the ancillary data after the UE 104 receives the random access response. The determination by the UE 104 is the same as explained with reference to option 1 above.

The indication, instead of being made using a random access preamble as in option 1, the indication is made in the RRC connection request, or resume message. This is step 1110. The determination by the network 1005 is the same as explained above as to whether, and of what type of ancillary data, the network requires. This is step 1115. This determination response from the network 1005 is sent in the RRC connection setup or resume message in step 1120.

In response to the indication in step 1120, the UE 104 determines whether to transmit the ancillary information. This is step 1125. Depending on the indication from the network 1005, the UE 104 may decide to send particular ancillary data or ancillary data in a particular format. The ancillary data is then sent on the RRC connection setup complete message in step 1130. The RRC connection setup complete message may be used to transmit the small sized ancillary data, such as cell IDs or cells meeting a threshold. However for other ancillary data such as RSRP measurement data (which are larger in size and should be sent securely to not allow a third party to establish the location of the UE 104), then the ancillary data may be sent in a later message.

In the examples of FIGS. 10 and 11, it is possible for the network 1005 to also indicate to the UE 104 whether to use the user plane or the control plane solution. For example, if the network 1005 decides to retrieve only the critical information then the control plane can be used. However, if the network 1005 wants to retrieve ancillary data that is measurement data for positioning or another purpose, then the user plane solution may be activated. Similarly, as explained above, for the smart-meter example, then the user plane solution may be activated as security is required.

The choice of message in which to send the ancillary information depends on the type of data as well as the size of data to be sent. For example, a short measurement report may be sent in step 1130 in the RRC connection setup complete message. However, a longer report of ancillary data such as one including RSRP measurements would be sent in a measurement report (step 1150). Given the content of the RSRP measurement data (which includes position information), the measurement report is sent after the activation of security in step 1140.

A third option is also envisaged. The third option is a combination of options 1 and 2 and determines in which position within the signal diagram to send ancillary message. Specifically, if the ancillary data to be transferred fits within the RRC connection request and no security is required, the ancillary information is transferred on the RRC connection request. Alternatively, if the ancillary message is larger than the RRC connection request, but is smaller than the RRC connection setup complete message and no security is required, then the ancillary data is sent in the RRC connection setup complete message and the control plane solution is required. Alternatively, if the ancillary data is larger than the RRC connection setup complete message or the ancillary data requires security, then the user plane solution is selected and the ancillary data is sent as a separate message after the security activation step 1140.

Various features of embodiments of the present technique are defined by the following numbered clauses:

1. A terminal device for use with a wireless telecommunications network, the terminal device comprising:
    storage configured to store ancillary information not essential to every connection between the terminal device and the wireless telecommunications network;
    a controller configured to produce data indicative of the stored ancillary information;
    a transmitter configured to transmit the produced data to the wireless telecommunication network; and
    a receiver configured to receive an indication from the wireless telecommunication network to transmit the ancillary information to the wireless telecommunication network, wherein in response to the indication, the transmitter is configured to transmit the ancillary information.

2. A terminal device according to clause 1, wherein the controller is configured to measure a signal parameter of the wireless telecommunications network, and the ancillary information is measurement data which is measured by the terminal device 3. A terminal device according to clause 1 or 2, wherein the produced data is a preamble and the controller is configured to select the preamble from a set of random access preambles provided by the wireless telecommunications network.

4. A terminal device according to clause 1, 2 or 3, wherein produced data is a preamble and the controller is configured to select the preamble based on the size of the stored ancillary information so that a first preamble is selected in the event that the size of stored ancillary information is at or below a first threshold and that a second, different, preamble is selected in the event that the size of the stored ancillary information is above the first threshold.

5. A terminal device according to clause 1 or 2, wherein the produced data is a random access message indication.

6. A terminal device according to clause 5, wherein in the event that the size of the ancillary information is less than a second threshold value, the transmitter is configured to transmit the ancillary information in the radio resource control connection setup complete signal.

7. A terminal device according to any of clause 1 to 4, wherein the produced data is a random access preamble and in the event that the size of the ancillary information is less than a second threshold value, the transmitter is configured to transmit the ancillary information in the radio resource control connection setup complete signal and the controller is configured to control the transmitter to transmit the ancillary information using a control plane message.

8. A terminal device according to any of clause 1 to 4, wherein the produced data is a random access preamble and in the event that the size of the ancillary information is at or greater than a second threshold value, and/or the ancillary information requires a secure connection with the network, the controller is configured to control the transmitter to transmit the ancillary information using a dedicated user plane radio bearer.

9. A terminal device according to any preceding clause, wherein the terminal device is a Narrow Band Internet of Things (NB-IoT) terminal device.

10. A terminal device according to any preceding clause, wherein the receiver is configured to receive from the wireless telecommunication network an indication of the type and format of the message which is to convey the ancillary information.

11. Infrastructure equipment for use with a wireless telecommunications network, the infrastructure equipment comprising:
- a receiver configured to receive indicative data from a terminal device indicating that the terminal device has stored ancillary information not essential to every connection between the terminal device and the wireless telecommunications network;
- a controller configured to determine whether to request the ancillary information from the terminal device; and
- a transmitter, under control of the controller, configured to transmit a request for the stored ancillary information; wherein the receiver is configured to receive the ancillary information.

12. Infrastructure equipment according to clause 11, wherein the ancillary information is measurement data which is measured by the terminal device 13. Infrastructure equipment according to clause 11 or 12, wherein the controller is configured to produce a set of preamble data and the indicative data is selected by the terminal device from the set of preamble data.

14. Infrastructure equipment according to any of clause 11 12 or 13, wherein the indicative data is a random access message indication.

15. Infrastructure equipment according to clause 14, wherein in the event that the size of the ancillary information is less than a threshold value, the receiver is configured to receive the ancillary information in the radio resource control connection setup complete signal.

16. Infrastructure equipment according to any one of clause 11 to 15, wherein the indicative data is a random access preamble and in the event that the size of the ancillary information is less than a threshold value, the receiver is configured to receive the ancillary information in the radio resource control connection setup complete signal and the controller is configured to control the receiver to receive the ancillary information using a control plane message.

17. Infrastructure equipment according to any one of clause 11 to 15, wherein the indicative data is a random access preamble and in the event that the size of the ancillary information is at or greater than a threshold value, and/or the ancillary information requires a secure connection with the network, the controller is configured to control the receiver to receive the ancillary information using a dedicated user plane radio bearer.

18. Infrastructure equipment according to any one of clause 11 to 15, wherein the infrastructure equipment is a Narrow Band Internet of Things (NB-IoT) infrastructure equipment and the terminal device is an NB-IoT terminal device.

19. Infrastructure equipment according to any one of clause 11 to 15, wherein the transmitter is configured to transmit to the terminal device an indication of the type and format of the message which is to convey the ancillary information.

20. A method of controlling a terminal device for use with a wireless telecommunications network, the method comprising:
- storing ancillary information not essential to every connection between the terminal device and the wireless telecommunications network;
- producing data indicative of the stored ancillary information;
- transmitting the produced data to the wireless telecommunication network;
- receiving an indication from the wireless telecommunication network to transmit the ancillary information to the wireless telecommunication network, wherein in response to the indication; and
- transmitting the ancillary information.

21. A method of controlling infrastructure equipment for use with a wireless telecommunications network, the method comprising:
- receiving indicative data from a terminal device indicating that the terminal device has stored ancillary information not essential to every connection between the terminal device and the wireless telecommunications network;
- determining whether to request the ancillary information from the terminal device; and
- transmitting a request for the stored ancillary information; wherein the receiver is configured to receive the ancillary information.

22. Integrated circuitry for a terminal device for use with a wireless telecommunications network, the integrated circuitry comprising
- a storage element configured to store ancillary information not essential to every connection between the terminal device and the wireless telecommunications network;
- a controller element configured to produce data indicative of the stored ancillary information;
- a transmitter element configured to transmit the produced data to the wireless telecommunication network; and
- a receiver element configured to receive an indication from the wireless telecommunication network to transmit the ancillary information to the wireless telecommunication network, wherein in response to the indication, the transmitter is configured to transmit the ancillary information.

23. Integrated circuitry for infrastructure equipment for use with a wireless telecommunications network, the integrated circuitry comprising a receiver element configured to receive indicative data from a terminal device indicating that the terminal device has stored ancillary information not essential to every connection between the terminal device and the wireless telecommunications network;
- a controller element configured to determine whether to request the ancillary information from the terminal device; and a transmitter element, under control of the controller element, configured to transmit a request for the stored ancillary information; wherein the receiver is configured to receive the ancillary information.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required.

Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R2-161309, "Measurement Reporting in NB-IoT", 3GPP TSG-RAN2 Meeting #93

The invention claimed is:

1. A method of controlling a terminal device for use with a wireless telecommunications network, the method comprising:
    storing ancillary information not essential to every connection between the terminal device and the wireless telecommunications network;
    producing data indicative of the stored ancillary information;
    transmitting the produced data to the wireless telecommunication network;
    receiving an indication from the wireless telecommunication network to transmit the ancillary information to the wireless telecommunication network;
    determining, in accordance with whether the ancillary information requires security, whether to transmit the ancillary information using a control plane solution or a user plane solution; and
    transmitting the ancillary information using a determined one of the control plane solution or the user plane solution.

2. The method according to claim 1, comprising measuring a signal parameter from the wireless telecommunications network, and wherein the ancillary information is measurement data which is measured by the terminal device.

3. The method according to claim 1, wherein the produced data is a preamble, and comprising selecting the preamble from a set of random access preambles provided by the wireless telecommunications network.

4. The method according to claim 1, wherein the produced data is a preamble, and comprising selecting the preamble based on the size of the stored ancillary information so that a first preamble is selected in the event that the size of stored ancillary information is at or below a first threshold and selecting a second, different, preamble in the event that the size of the stored ancillary information is above the first threshold.

5. The method according to claim 1, wherein the produced data is a random access message indication.

6. The method according to claim 5, wherein in the event that the size of the ancillary information is less than a second threshold value, the method comprises transmitting the ancillary information in the radio resource control connection setup complete signal.

7. The method according to claim 1, wherein the produced data is a random access preamble, and in the event that the size of the ancillary information is less than a second threshold value, the method comprises transmitting the ancillary information in the radio resource control connection setup complete signal and transmitting the ancillary information using a control plane message in the control plane solution.

8. A method of controlling infrastructure equipment for use with a wireless telecommunications network, the method comprising:
    receiving indicative data from a terminal device indicating that the terminal device has stored ancillary information not essential to every connection between the terminal device and the wireless telecommunications network;
    determining whether to request the ancillary information from the terminal device;
    determining, in accordance with whether the ancillary information requires security, whether the ancillary information should be transmitted using a control plane solution or a user plane solution; and
    transmitting a request for the stored ancillary information; wherein the receiver is configured to receive the ancillary information using a determined one of the control plane solution or the user plane solution.

9. The method according to claim 8, wherein the ancillary information is measurement data which is measured by the terminal device.

10. The method according to claim 8, comprising producing a set of preamble data, and wherein the indicative data is selected by the terminal device from the set of preamble data.

11. The method according to claim 8, wherein the indicative data is a random access message indication.

12. The method according to claim 11, wherein in the event that the size of the ancillary information is less than a threshold value, the method comprises receiving the ancillary information in the radio resource control connection setup complete signal.

13. The method according to claim 8, wherein the indicative data is a random access preamble, and in the event that the size of the ancillary information is less than a threshold value, the method comprises receiving the ancillary information in the radio resource control connection setup complete signal and receiving the ancillary information using a control plane message in the control plane solution.

14. Integrated circuitry for infrastructure equipment for use with a wireless telecommunications network, the integrated circuitry comprising:
   circuitry configured to implement
   a receiver configured to receive indicative data from a terminal device indicating that the terminal device has stored ancillary information not essential to every connection between the terminal device and the wireless telecommunications network;
   a controller configured to determine whether to request the ancillary information from the terminal device and to determine, in accordance with whether the ancillary information requires security, whether to transmit the ancillary information using a control plane solution or a user plane solution; and
   a transmitter, under control of the controller, configured to transmit a request for the stored ancillary information;
   wherein the receiver is configured to receive the ancillary information using a determined one of the control plane solution or the user plane solution.

15. The integrated circuitry according to claim 14, wherein the ancillary information is measurement data which is measured by the terminal device.

16. The integrated circuitry according to claim 14, wherein the circuitry is configured to produce a set of preamble data, and the indicative data is selected by the terminal device from the set of preamble data.

17. The integrated circuitry according to claim 14, wherein the indicative data is a random access message indication.

18. The integrated circuitry according to claim 14, wherein in the event that the size of the ancillary information is less than a threshold value, the circuitry is configured to receive the ancillary information in the radio resource control connection setup complete signal.

19. The integrated circuitry according to claim 14, wherein the indicative data is a random access preamble, and in the event that the size of the ancillary information is less than a threshold value, the circuitry is configured to receive the ancillary information in the radio resource control connection setup complete signal and receive the ancillary information using a control plane message in the control plane solution.

20. The integrated circuitry according to claim 14, wherein the indicative data is a random access preamble, and in the event that the size of the ancillary information is at or greater than a threshold value, and/or the ancillary information requires the secure connection with the network, the circuitry is configured to control the receiver to receive the ancillary information using a dedicated user plane radio bearer in the user plane solution.

* * * * *